P. R. FORMAN.
SAFETY APPLIANCE FOR MOTORS.
APPLICATION FILED NOV. 23, 1909.
980,090.
Patented Dec. 27, 1910.
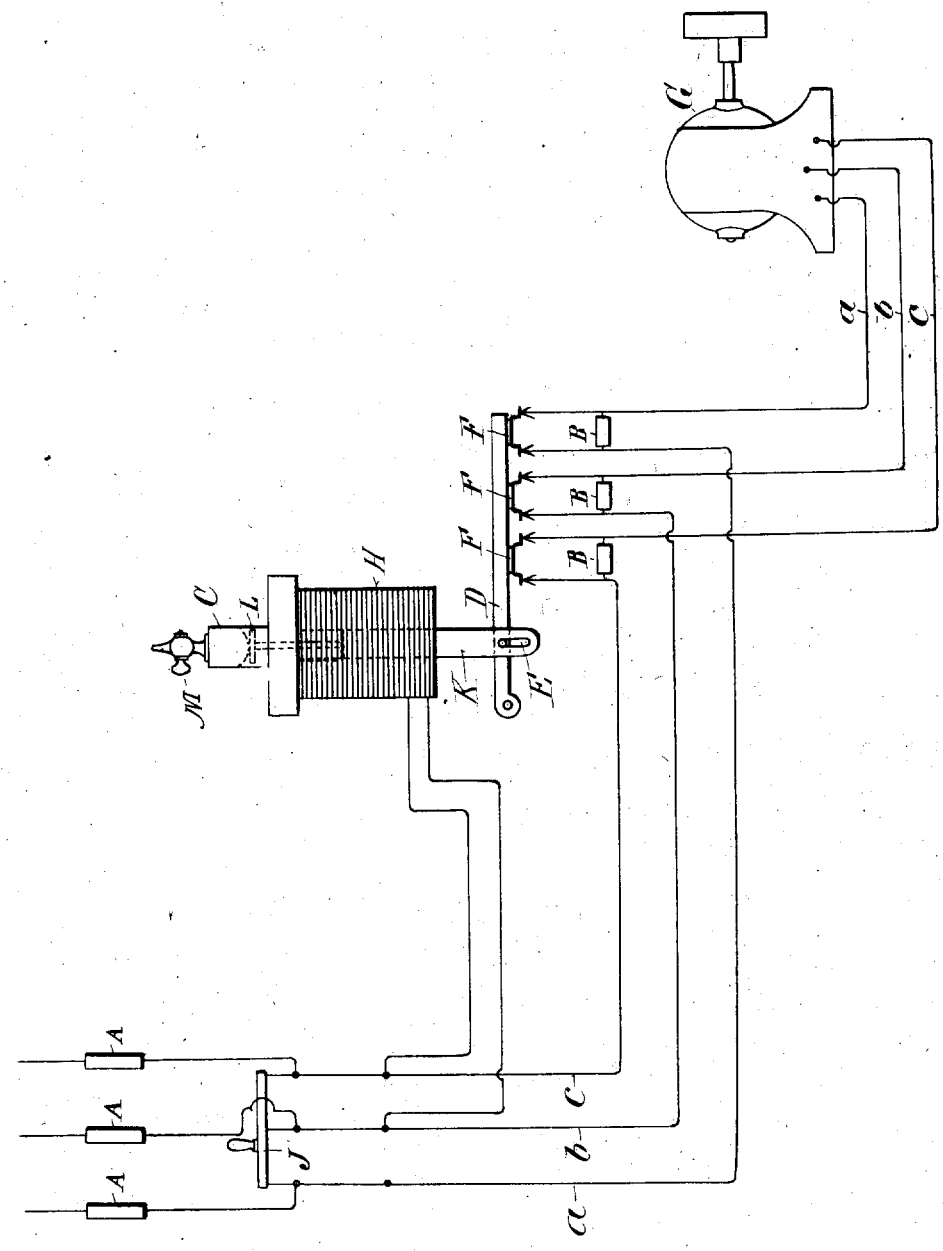
Witnesses:
E. C. Hunicke
M. L. Clinton
Paris R. Forman Inventor
By his Attorney
Samuel E. Darby

UNITED STATES PATENT OFFICE.

PARIS R. FORMAN, OF CHICAGO, ILLINOIS, ASSIGNOR TO THE BURDETT-ROWNTREE MANUFACTURING COMPANY, OF CHICAGO, ILLINOIS, A CORPORATION OF ILLINOIS.

SAFETY APPLIANCE FOR MOTORS.

980,090.  Specification of Letters Patent.  Patented Dec. 27, 1910.

Application filed November 23, 1909. Serial No. 529,602.

*To all whom it may concern:*

Be it known that I, PARIS R. FORMAN, a citizen of the United States, residing at Chicago, county of Cook, State of Illinois, have made a certain new and useful Invention in Safety Appliances for Motors, of which the following is a specification.

This invention relates to safety appliances for motors, and particularly, to means for protecting the motor windings from undue rushes of current.

A further object of the invention is to provide means which are simple and efficient whereby, in starting up a motor it is protected by a fuse of large capacity, and, after starting, a fuse of smaller capacity is automatically placed in the motor circuit.

Other objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

The drawing shows in diagrammatic elevation an arrangement of motor safety appliances embodying my invention, as applied a three-phase alternating current motor.

It is a usual custom to protect motors from injury due to excessive supply of current, by the use of safety fuses. In the case of direct current motors it is also customary to employ a starting resistance to take care of the first rush of current in starting up the motor, the current, in starting up the motor being much greater than is required to operate the motor after it has attained its normal speed. This initial rush of current in starting the motor is even more pronounced in alternating current motors than with direct current motors. In certain types of alternating current motors it is also feasible to employ starting resistance to protect the motor windings against injury from the first rush of current in starting, the starting resistance in the case of both direct and alternating current motors being gradually cut out as they build up their own resistance through the development of counter-electromotive force, while attaining their normal speed of operation. In certain types of motors, however, it is not practicable to use any starting resistance or current restricting means, and in such cases dependence must be had on the fuses to protect the motors from injury. In any case, whether starting resistance is employed or not, should the motor get stuck, or get out of order, or be overloaded, or for other reason should be unable to create its normal counter-electromotive force, or its normal resistance, or should fail to attain its normal speed, the fuses employed are required to be of such large capacity to stand the large initial flow of current, and hence are of such capacity that the windings of the motor are burned out before the fuse will act.

It is among the special purposes of the present invention to provide means whereby in starting up the motor it is protected against the large initial flow of current, but after the lapse of a controllable interval of time a fuse of smaller capacity is automatically introduced into circuit thereby protecting the windings of the motor from injury due to a continued supply of unduly large current.

While the safety appliances embodying my invention are capable of use in connection with motors employing starting resistances, they are specially applicable to motors of the type where starting resistances are not used, or in place of starting resistances, and more particularly in connection with alternating current motors.

In the drawing reference sign G, designates a motor which is shown to be of the three-phase alternating current type though my invention, as defined in the claims, is not to be restricted or limited to a motor of this type.

J is the main switch for controlling the supply of current to the motor. In this instance the main switch controls each of the three wires, *a*, *b*, *c*, of the three wire system. In the main current supply circuit is a fuse A, of large capacity designed to carry the large volume of current required to start the motor. In the case illustrated, a large fuse A is included in each of the three wire circuits.

B designates auxiliary fuses of small capacity. In accordance with my invention these auxiliary fuses are arranged to be normally short circuited while the motor is starting up, or for a controllable interval of time after the main circuit is closed, and then their short circuits are automatically broken so that said auxiliary fuses are included in the motor circuits, thereby affording protection to the motor which it is not possible to secure from the fuses of large capacity. Many specifically different means may be employed to effect the short circuiting of the auxiliary fuses and the automatic rupture of such short circuits but since the breaking of said short circuits should be effected automatically and preferably after the lapse of a predetermined but controllable interval of time after the main motor circuit has been closed I prefer to operate the short circuiting devices of the auxiliary fuses by current supplied by the closing of the main switch.

In the particular embodiment of my invention which I have selected for illustration of the principles involved I employ a solenoid H, arranged to be energized by current supplied from either one or more of the circuit wires $a$, $b$, $c$. The core or plunger K, or the solenoid operates a lever D, carrying the contact strips F, which are insulated therefrom, and which control the short circuits of the auxiliary fuses B. It will be observed that the solenoid core or plunger is connected to the lever D through a pin and slot connection, the solenoid core or plunger having an elongated slot E, for this purpose, whereby the lever D remains in position for the contacts F to maintain the short circuits of fuses B, closed until after the lapse of an interval of time following the closing of the solenoid circuit. In order to control and regulate this interval of time as may be required, a piston L, is connected to the solenoid plunger K, and operates in an air dash pot cylinder C, having a stop cock M, to regulate the exhaust of air therefrom, thereby regulating the speed of movement of the solenoid core or plunger into the coil, and hence controlling the length of time current is supplied to the motor through the large fuses before the fuses of smaller capacity are placed in circuit. In practice the slot E and the air cock M, of the dash pot are so relatively adjusted that the length of time the fuses A, of large capacity are in service, before the fuses B of small capacity are placed in circuit, is ample to enable the motor under normal conditions to attain its normal speed and to build up its counter-electro-motive force. If, however, the motor should be out of order, or should be overloaded, or should get stuck, or otherwise be unable to build up its own resistance within this period of time, the operation of the apparatus is such that the fuses of small capacity are automatically cut into circuit and hence will be in working relation to break the motor circuit and therefore prevent damage to the motor.

Having now set forth the object and nature of my invention and an arrangement embodying the principles thereof, what I claim as new and useful, and of my own invention and desire to secure by Letters Patent is:—

1. In a safety appliance for motors the combination with a motor, of a fuse of large capacity in the circuit thereof, an auxiliary fuse of smaller capacity and means operated by the current supply in the circuit of the fuse of large capacity for introducing said auxiliary fuse into the motor circuit.

2. The combination with a motor, of a fuse of large capacity in the motor circuit, an auxiliary fuse of small capacity, also arranged in the motor circuit, a short circuit for said auxiliary fuse, and means operated by the current supply in the circuit of the fuse of large capacity for breaking said short circuit.

3. The combination with a motor, of a fuse of large capacity in the motor circuit, an auxiliary fuse of small capacity also arranged in the motor circuit, a short circuit for the auxiliary fuse, and means operated by current in the motor circuit for breaking said short circuit.

4. The combination with a motor, of a fuse of large capacity in the motor circuit, an auxiliary fuse of small capacity, means operated by the closing of the motor-circuit for including the auxiliary fuse in the motor circuit, and means for controlling the time interval between the closing of the motor circuit and the introduction of the auxiliary fuse into the motor circuit.

5. The combination with a motor of a fuse of large capacity in the motor circuit, an auxiliary fuse of small capacity also in the motor circuit, a short circuit for the auxiliary fuse, means operated by current in the motor circuit for breaking said short circuit, and means for controlling the time at which said short circuit breaking means operates.

6. The combination with a motor, of a fuse of large capacity in the motor circuit, an auxiliary fuse of small capacity also in the motor circuit, a short circuit for said auxiliary fuse, a solenoid for braking said short circuit, and means for controlling the action of the solenoid.

7. The combination with a motor, of a fuse of large capacity in the motor circuit, an auxiliary fuse of small capacity also in the motor circuit, a short circuit for the auxiliary fuse, a solenoid for breaking said short circuit, and a dash pot for controlling the action of the solenoid.

8. The combination with a motor, of a fuse of large capacity in the motor circuit, an auxiliary fuse of small capacity also in the motor circuit, a short circuit for the auxiliary fuse, a lever for controlling said short circuit, and a solenoid for operating the lever.

9. The combination with a motor, of a fuse of large capacity in the motor circuit, an auxiliary fuse of small capacity also in the motor circuit, a short circuit for the auxiliary fuse, a lever for controlling the short circuit, a solenoid operated by current in the motor circuit for moving the lever, and a dash pot for regulating the action of the solenoid.

10. The combination with a motor, of a fuse of large capacity in the motor circuit, an auxiliary fuse of small capacity also in the motor circuit, a short circuit for the auxiliary fuse, a lever for controlling said short circuit, a solenoid operated by current in the motor circuit, and a lost motion connection between the solenoid and lever.

11. The combination with a motor, of a fuse of large capacity in the motor circuit, an auxiliary fuse of small capacity also in the motor circuit, a short circuit for the auxiliary fuse, a lever for controlling said short circuit, a solenoid, a pin and slot connection between the solenoid plunger and said lever, and a dash pot for regulating the movement of the solenoid plunger.

In testimony whereof I have hereunto set my hand in the presence of the subscribing witnesses, on this eighteenth day of November A. D., 1909.

PARIS R. FORMAN.

Witnesses:
J. G. MITCHELL,
L. M. SHIELDS.